(12) United States Patent
Nurse, Jr. et al.

(10) Patent No.: US 6,360,898 B1
(45) Date of Patent: *Mar. 26, 2002

(54) FILTRATION DEVICE FOR A WASTE WATER TREATMENT SYSTEM

(75) Inventors: Harry L. Nurse, Jr., P. O. Box 1520, Crestwood, KY (US) 40014; John Christensen, Louisville, KY (US)

(73) Assignee: Harry L. Nurse, Jr., Goshen, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,485

(22) Filed: Apr. 6, 2000

(51) Int. Cl.⁷ .............................................. B01D 29/46
(52) U.S. Cl. ...................... 210/435; 210/314; 210/316; 210/320; 210/335; 210/336; 210/487; 210/489; 210/521; 210/532.2
(58) Field of Search ...................... 210/435, 488–489, 210/483, 486–487, 521, 532.1, 532.2, 336, 335, 346, 320, 314, 316, 304, 253, 230, 337–338; 285/123.1, 123.2, 123.15, 921; 138/112–113, 115–117, 114

(56) References Cited

U.S. PATENT DOCUMENTS

| | | | |
|---|---|---|---|
| 2,900,084 A | | 8/1959 | Zabel |
| 3,332,552 A | | 7/1967 | Zabel |
| 3,947,252 A | * | 3/1976 | Musall et al. |
| 4,710,295 A | | 12/1987 | Zabel ........................ 210/336 |
| 5,264,120 A | | 11/1993 | Graves ....................... 210/109 |
| 5,382,357 A | | 1/1995 | Nurse |
| 5,482,621 A | | 1/1996 | Nurse ........................ 210/170 |
| 5,582,716 A | | 12/1996 | Nurse, Jr. ................... 210/121 |
| 5,593,584 A | | 1/1997 | Nurse, Jr. ................... 210/346 |
| 5,762,790 A | | 6/1998 | Zoeller ....................... 210/238 |
| 5,885,452 A | | 3/1999 | Koteskey ..................... 210/309 |
| 5,927,728 A | | 7/1999 | Achenbach et al. |
| 5,934,315 A | | 8/1999 | Braswell et al. |

\* cited by examiner

*Primary Examiner*—Matthew O. Savage
*Assistant Examiner*—Marianne Ocampo
(74) *Attorney, Agent, or Firm*—Charles G. Lamb; Middleton Reutlinger

(57) ABSTRACT

A filter and housing for waste water treatment includes a housing having a plurality of coaxially mounted vertically extending sections adaptable to receive a filter cartridge therein. An upper section is provided with an outlet consisting of at least two coaxially aligned rings of preselected diameters wherein the thickness of the rings and the spacing between the rings is sufficient to receive waste water treatment outlets of different diameters. The filter cartridge is comprised of a stacked arrangement of a plurality of disc-dam units wherein each disc-dam unit is provided with a serpentine configured first dam, the first dam extending upwardly from an upper surface of the disc-dam unit, the first dam having terminating ends spaced at outer terminating edges of the disc dam unit to define a cord segment therebetween. The terminating ends are connected by a second dam having a height less than the first dam. The serpentine configured first dam divides the disc-dam unit into an upstream side along the outer periphery and a downstream side along the inner periphery. Slots are positioned within the serpentine configured dam on the upstream side thereby providing flow communication with underlying disc-dam units. The top of the first dam is of a preselected height so as to provide a preselected spacing between the top of the first dam and the under surface of an overlying disc-dam unit.

12 Claims, 10 Drawing Sheets

FILTRATION DEVICE FOR A WASTE WATER TREATMENT SYSTEM

BACKGROUND OF THE INVENTION

The present invention relates to a filter and filter housing for use in a waste water treatment system and more particularly relates to a sectionalized filter housing having capability of receiving filter cartridges of various lengths and is adaptable for connecting to water treatment tank outlet pipes of varying diameters.

In the treatment of waste water, particularly in septic tanks, it is common to install filters to remove particulates being discharged from the tank which are generally undigested solids so that the discharging effluent is a relatively colorless and harmless liquid. There have been a number of filter units designed over the years for the removal of these undigested solids from the waste water prior to discharge from a septic tank or the like. For example, U.S. Pat. Nos. 2,900,084; 3,332,552; and, 4,710,295 to Robert Zabel teach a waste water treatment filtration system which includes a plurality of disc-dam units disposed in a stack, vertically spaced, in a super-imposed relationship such that the bottom of each overlying disc-dam unit cooperates with the upper edges of each underlying unit to form a horizontally elongated vertically narrow outlet slots. The stack of disc-dam units are mounted in a cylindrical housing with several slots located above and several slots located below the liquid operating level in a waste water tank. In operation, the digested waste water is received through a bottom opening of the housing and the discharging clarified effluent flows through a sidewall outlet which is in flow communication with an outlet from the waste water tank. However, it has been found that septic tanks or waste water treatment tanks come in different sizes and capacities and also the outlet discharge from the waste water tank is not of a standard size. Thus, for residential and commercial applications it is difficult to provide a filter housing unit of varying filtration capacities and with discharge outlets adaptable to mate with the various sizes of outlet discharge pipes or conduits from the waste water treatment tank.

SUMMARY OF THE INVENTION

It is an object of the present invention to provide a filter housing for a waste water treatment tank that includes a plurality of vertically extending interchangeable sections which allows for the design of a filter housing providing for a filtration system of different filtering capacities.

It is another object of the present invention to provide a filter housing have an outlet which is adaptable for mating with waste water treatment tank outlets of different sizes.

It is a further object of the present invention to provide a filter housing which is relatively inexpensive and easy to install.

It is even a further object of the present invention to provide a filter cartridge of disc-dam filter units in a filter housing that reduces turbulence during the upflow of waste water in the cartridge.

It is also an object of the present invention to provide a filter cartridge of disc-dam filter units wherein the discs have a diameter of less than 1/8" of the inside diameter of the filter housing.

More particularly, the present invention provides a filter and a housing for a waste water treatment system wherein the housing includes at least an upper section with an outlet for flow communication with a waste water treatment tank discharge outlet and a lower section with an open bottom to receive upward flow therethrough. The upper section is mounted above the lower section and there may be a plurality of middle sections mounted between the upper section and the lower section to accommodate filter cartridges of various lengths. Each of the sections of the housing include means to receive a plurality of disc-dam units therein. The plurality of disc-dam units in a stack arrangement define the filter cartridge with a longitudinally extending axis. Each of the disc-dam units is of a generally circular-shaped disc having an outer terminating edge, the base portion of each unit having a planar under surface and an upper surface with a first dam of serpentine configuration having a first and second terminating end. The dam which extends upwards from the upper surface of the base portion terminates in a dam top whereby a preselected distance is defined between the dam top and the under surface of an overlying disc. The first end and the second end of the dam define a cord segment therebetween, the dam dividing the base portion into an upstream and downstream side, the upstream side being along an outer periphery of the base portion and the downstream side being along an inner periphery of the base portion. The cord segment provides a cut out which extends from a second dam which connects the first and second ends of the outer terminating edge of the first dam wherein the second dam has a height less than the height of the first dam. Moreover, each of the discs are provided with a plurality of upstream openings in the upstream side of the base portion which are in flow communication with an adjacent underlying disc-dam unit. The flow through openings are generally positioned within the serpentine configured dam. The cut-outs of each disc are aligned to form an outlet flow chamber which is in flow communication with an outlet waste water treatment tank discharge outlet.

The lower section of the housing is provided with an inwardly extending sealing edge positioned for alignment with the disc-dam unit cut outs. The sealing edge is in contacting relation with the lowermost disc-dam unit wherein the sealing edge covers the cut out of the lowermost disc-dam unit thereby sealing the bottom of the outlet flow chamber from the incoming waste water to be filtered.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE DRAWINGS

Figure 1:
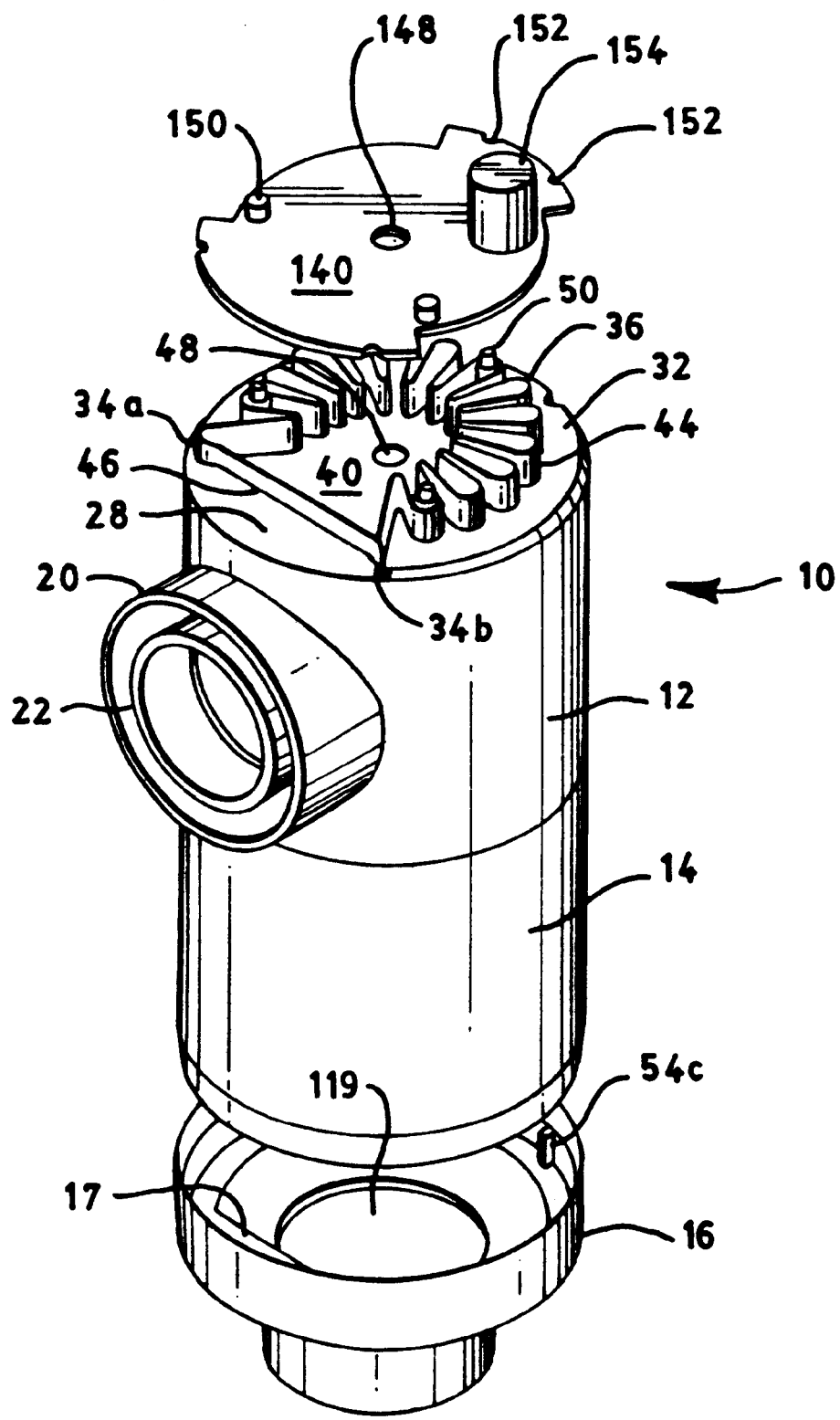
FIG. 1 is a perspective view, with selected portions shown exploded, of a preferred filter and housing of the present invention.

Referring to FIG. 1, which is an exploded perspective view of one preferred embodiment of the present invention, a filter housing 10 includes a plurality of sections mounted one on top of the other. As shown, the filter housing 10 is provided with an upper section 12 mounted above and onto a middle section 14 which, in turn, is mounted above and onto a lower section 16. Each of the sections are of the same diameter and are made of any suitable material, such as a thermo-plastic material, which is well known in the art. An outlet discharge is provided on the upper section and is generally comprised of a plurality of outwardly extending co-axial rings, such as first and second rings 20 and 22, of a preselected size and thickness so that the outlet discharge from the upper section 12 can receive in a male or female arrangement a plurality of waste treatment discharge outlets of different diameters. The first ring 20 circumscribing the second ring 22, and the first ring 20 having an inner diameter greater than an outer diameter of the second ring 22, as in FIG. 3. Even though two rings 20 and 22 are shown, it is realized that additional rings may be provided at the outlet from the upper section 12 to accommodate even a larger number of waste water treatment outlets.

Figure 3:
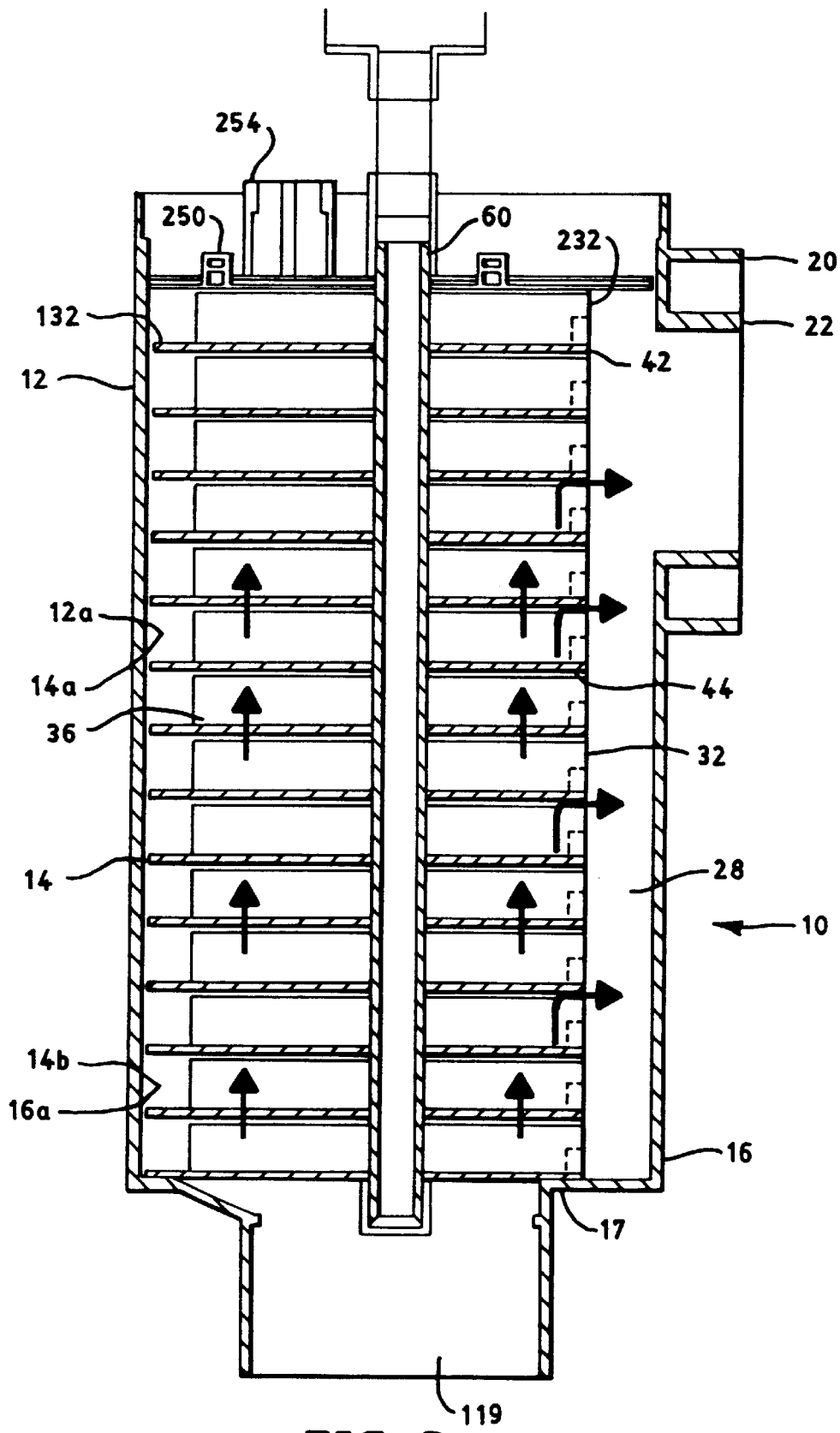
FIG. 3 is a side elevational view, in section, of the arrangement shown in FIG. 1 in assembled form.

Within the filter housing sections 12, 14, 16, a plurality of disc-dam units 32 are in a vertically spaced arrangement, as best shown in FIG. 3. A filter cartridge is comprised of a plurality of filter discs or disc-dam units 32 of generally circular cross section with a cut out cord section which is defined by a dam 46 which connects with terminating edges 34a and 34b of a serpentine configured dam 36 and the inner surface of the sections of the housing, such as upper section 12 as shown in FIG. 1. Each disc-dam unit is in parallel with overlying and underlying discs 32 with interlocking connectors 50 wherein the connectors 50 are of preselected configuration to provide a space between the dam top 44, and the under surface 42 of an overlying disc 32, as best shown in FIG. 3. The disc 32 is generally made of a suitable material, such as a thermo-plastic material. Also, discs 32 have a diameter as close as possible to the inside diameter of the housing sections 12, 14, 16 as practical. The discs 32 diameter are generally within ⅛" of the inside diameter of housing sections 12, 14, 16 to prevent upflow of solids along the outer periphery of the filter cartridge.

Figure 2A:
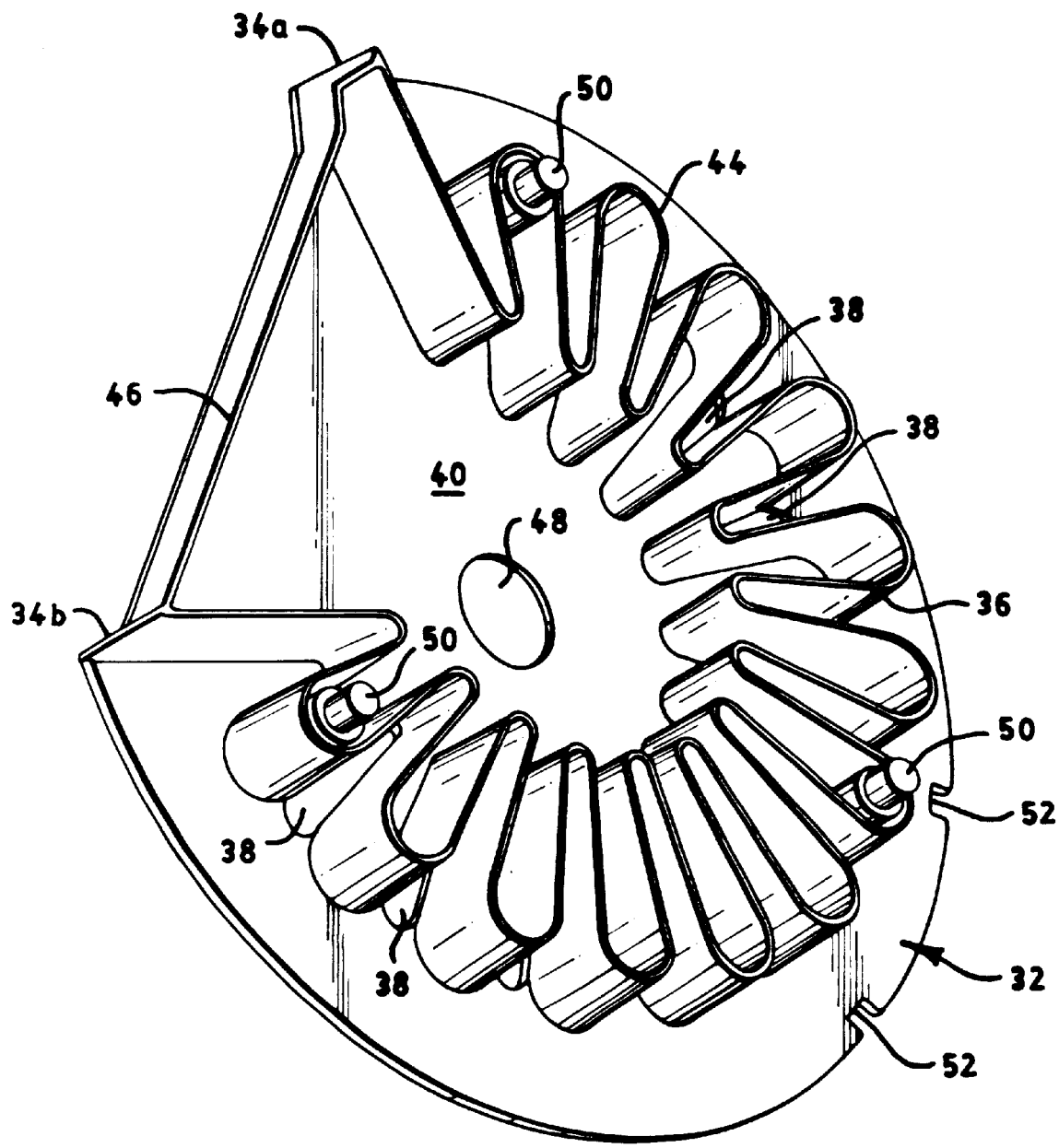
FIG. 2A is a perspective view of one preferred disc-dam unit of the present invention.
Figure 5A:
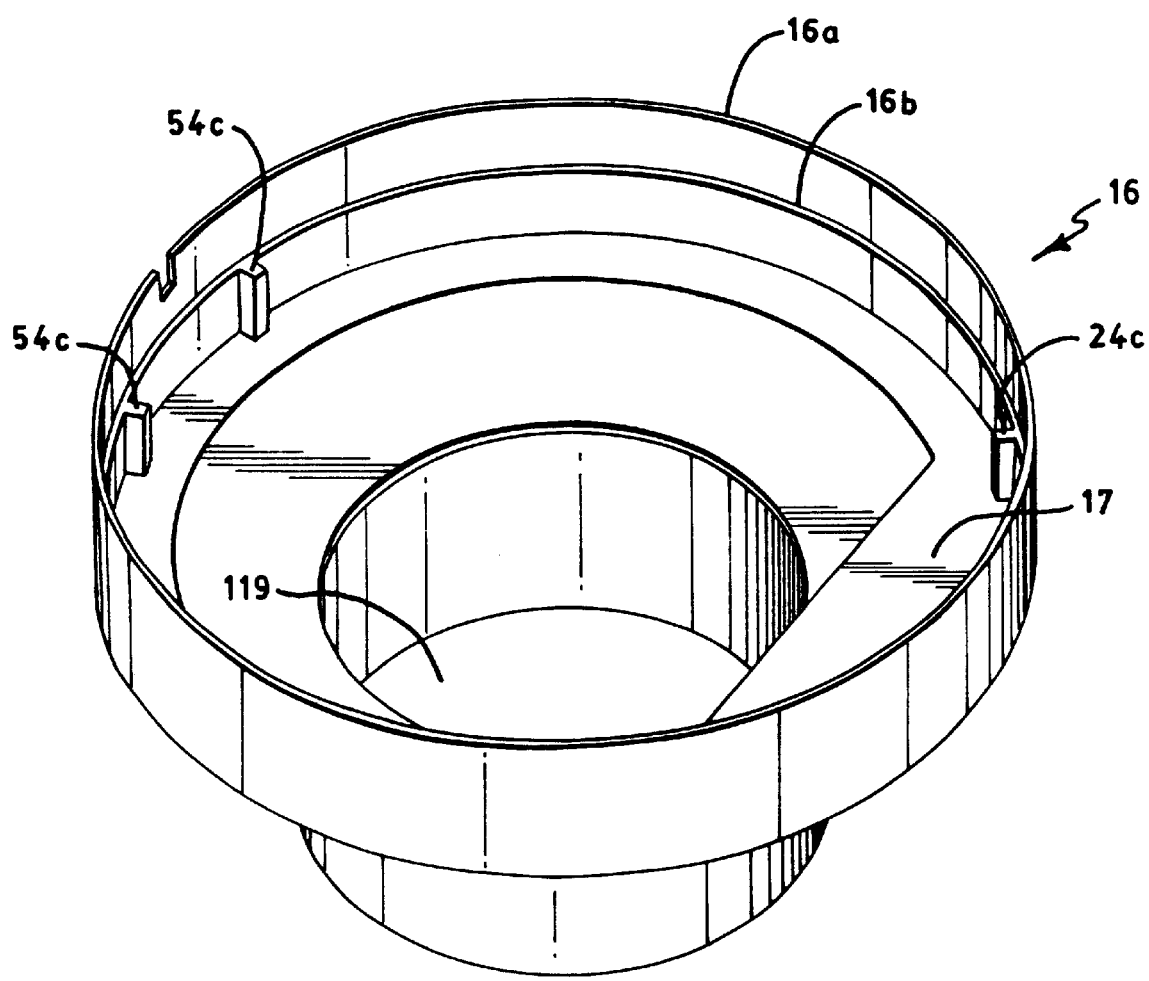
FIG. 5A is a perspective view of a lower section of the filter housing of FIG. 1.
Figure 5B:
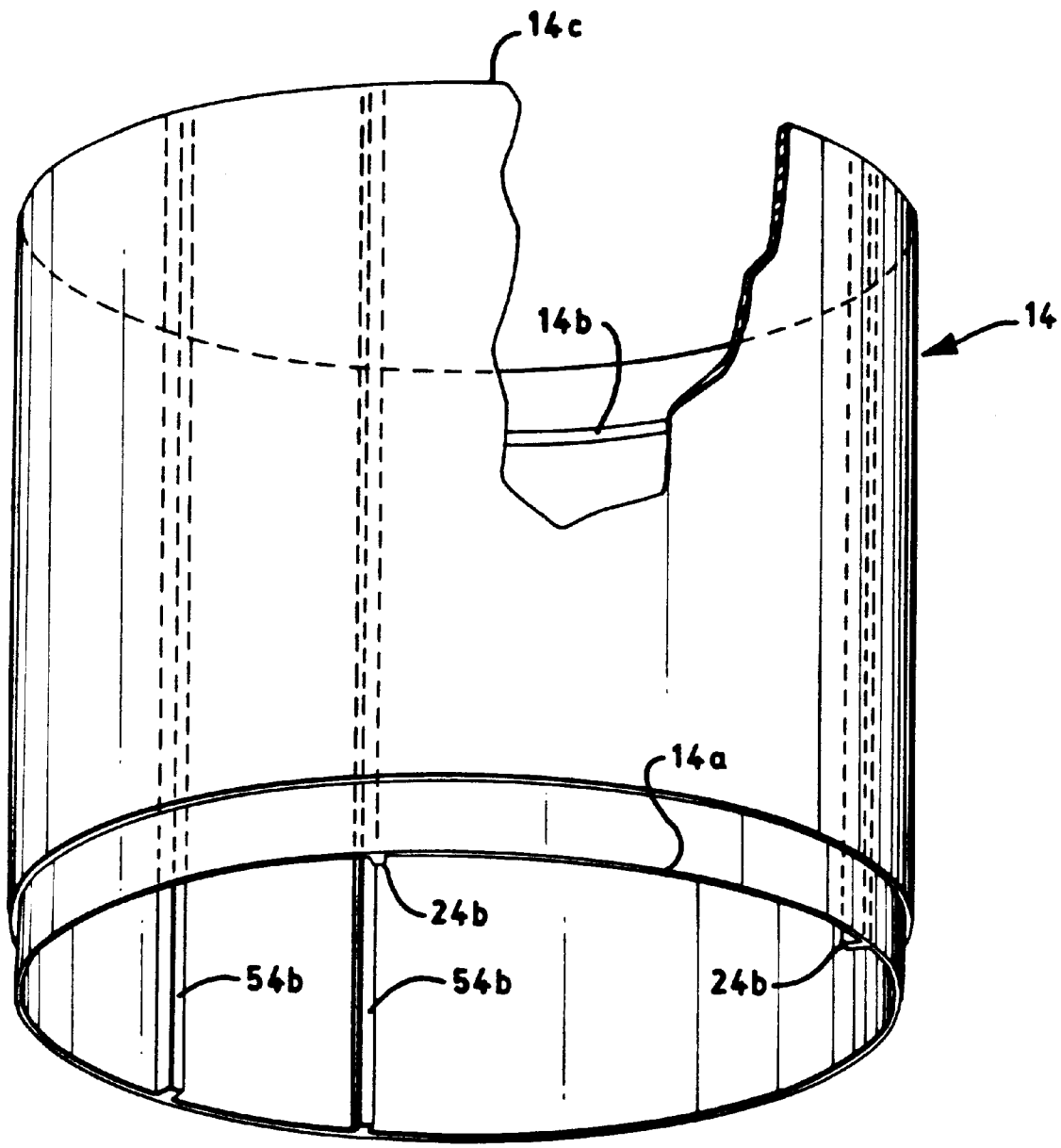
FIG. 5B is a perspective view of a middle section of the filter housing of FIG. 1 with selected portions shown in phantom lines.
Figure 5C:
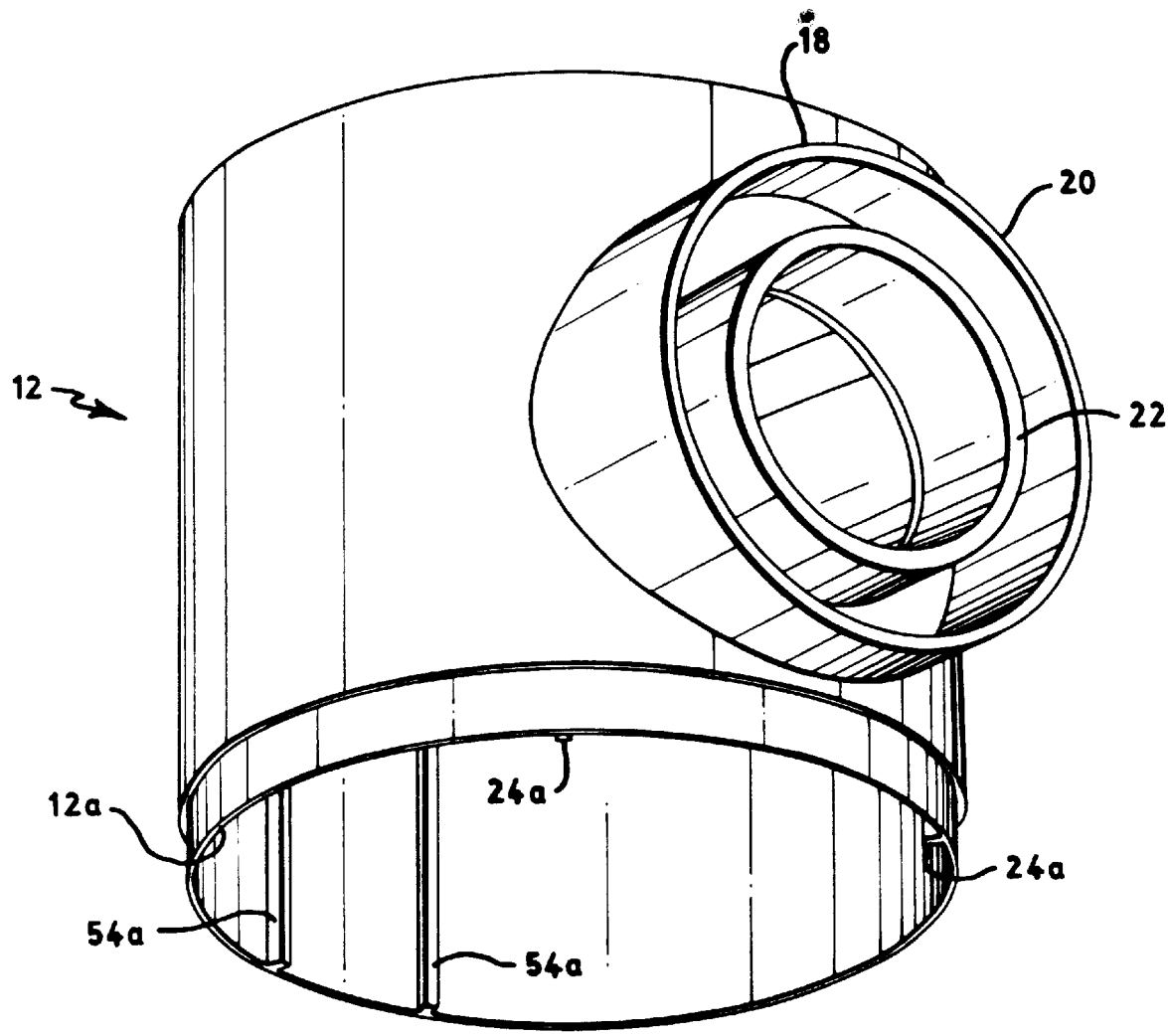
FIG. 5C is a perspective view of an upper section of the filter housing of FIG. 1; and, FIG. 6 is a view of the arrangement of the filter housing assembly shown in FIG. 1 in a waste water treatment tank.
Figure 6:
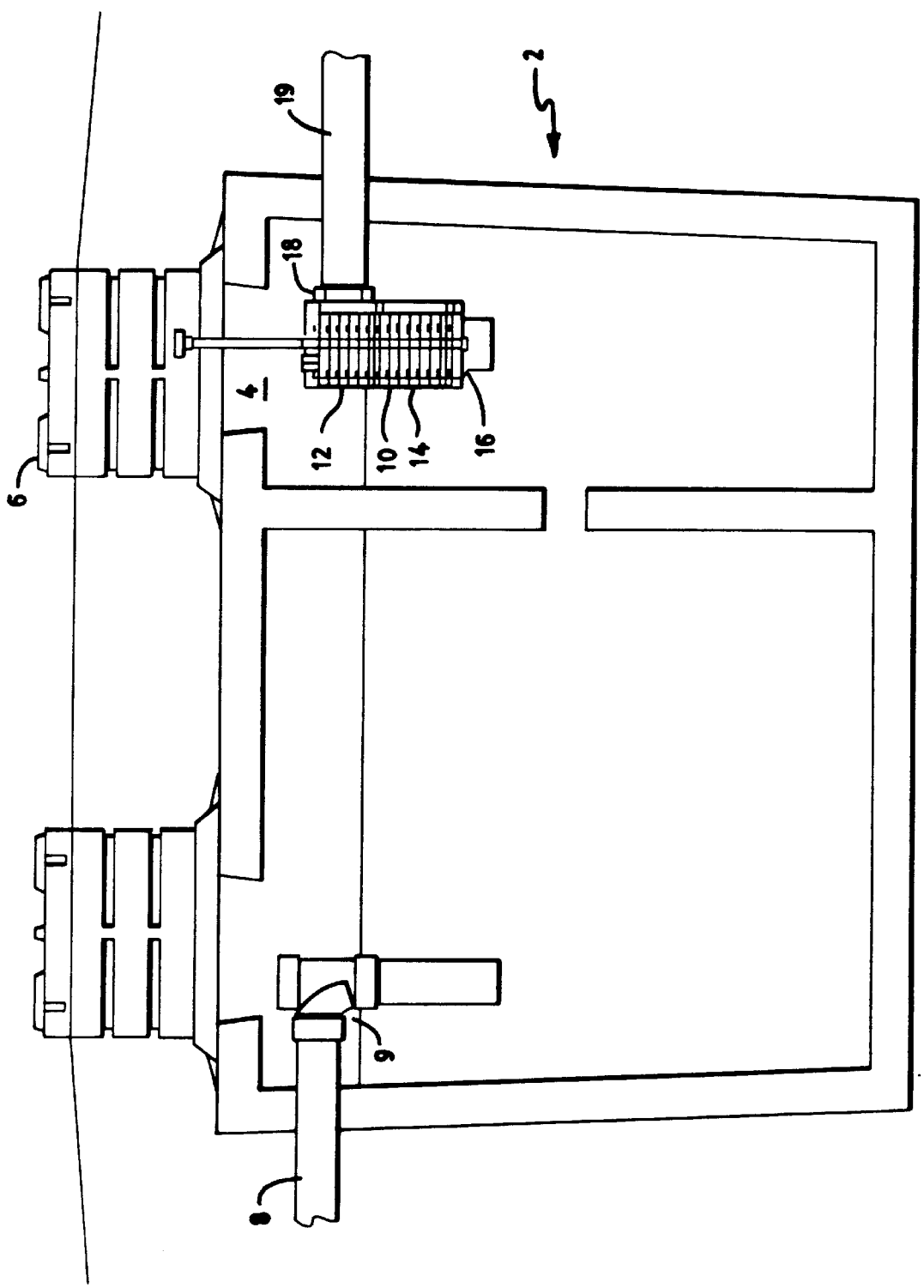

As shown in FIG. 2A, a disc-dam unit 32 comprises an elongated over-flow dam 36 which extends from one of the edges identified as 34a or 34b to the other terminating edge 34a or 34b in a serpentine or sinuous path on the upper surface 40 of the disc 32. The dam 36 extends vertically upward a preselected distance and in a stacked arrangement defines a spacing between the top 44 of the dam 36 and the under surface 42 of the overlying disc 32. On one side of the dam 36 is an upstream portion which receives upwardly flowing non-filtered material through elongated slots 38 which are generally located within the curved portion of the sinuous path of the dam 36. Positioning the inlet slots 38 in the curved portion of the sinuous path provides an upwardly flowing flow path that is not subjected to turbulence as it flows vertically and over the top 44 of the dam 36 and into the downstream side which is defined by the inner periphery of the sinuous path of the dam 36. The outer periphery of the disc 32 and the outer surface of the dam 36 define the upstream portion. The serpentine configured dam 36 terminates with a terminating edge 34a at one end and with a terminating edge 34b at an opposed end. The terminating edges 34a and 34b are connected by a second or outlet dam 46 wherein the outlet dam is of a height less than the height of the serpentine configured dam 36. Thus, the flow of filtered fluid from the downstream side or inner portion of the disc overflows the dam 46 and into an outlet chamber 28 located adjacent an outer side of said filter cartridge which is defined by the stacked arrangement of the discs 32 and the dam 46 terminating edges 34a and 34b in sealing relation with seal members 24a, 24b, 24c, as shown in FIGS. 5A, 5B and 5C. This arrangement defines the outlet flow chamber 28 for receiving the filtered waste water from the filter cartridge. The chamber 28 is in flow communication with the outlet 19 from the waste water treatment tank (FIG. 6). Centrally located in each of the discs is an opening 48 to receive a support pipe 60 (FIG. 3) therethrough.

The discs 32 are also provided with notches 52 for engaging with lobes 54a, 54b, and 54c, of the filter sections 12, 14 and 16 (FIGS. 5A, 5B and 5C). The lobes 54a, 54b, and 54c, and the pipe 60 on which the disc-dam units 32 are mounted, in alignment with the interlocking connectors 50, provide for an easy assembly in stable relationship between the plurality of the disc-dams units 32 making up the filter cartridge in a use condition.

Figure 2B:
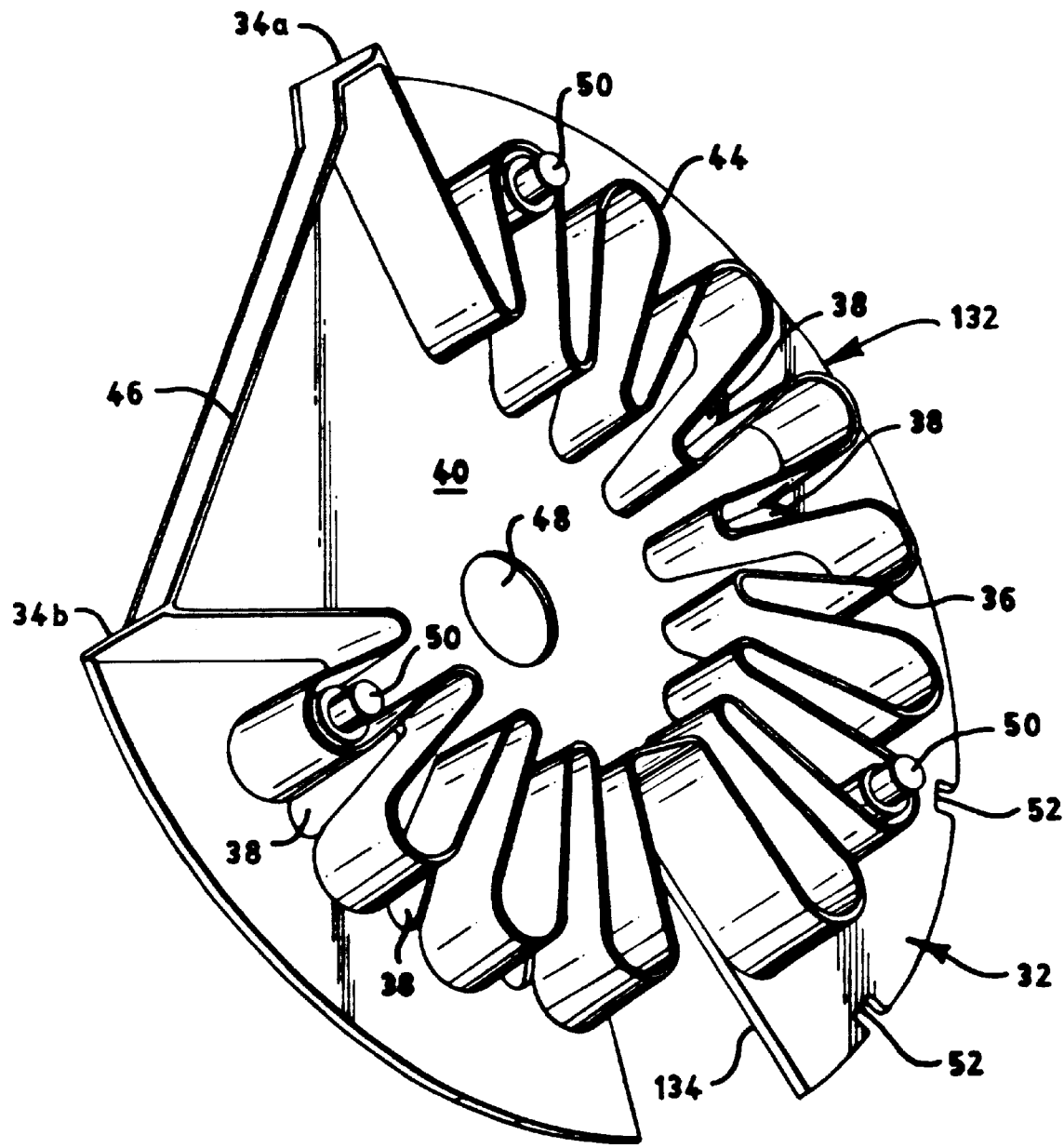
FIG. 2B is a perspective view of another disc-dam unit of the present invention.
Figure 2C:
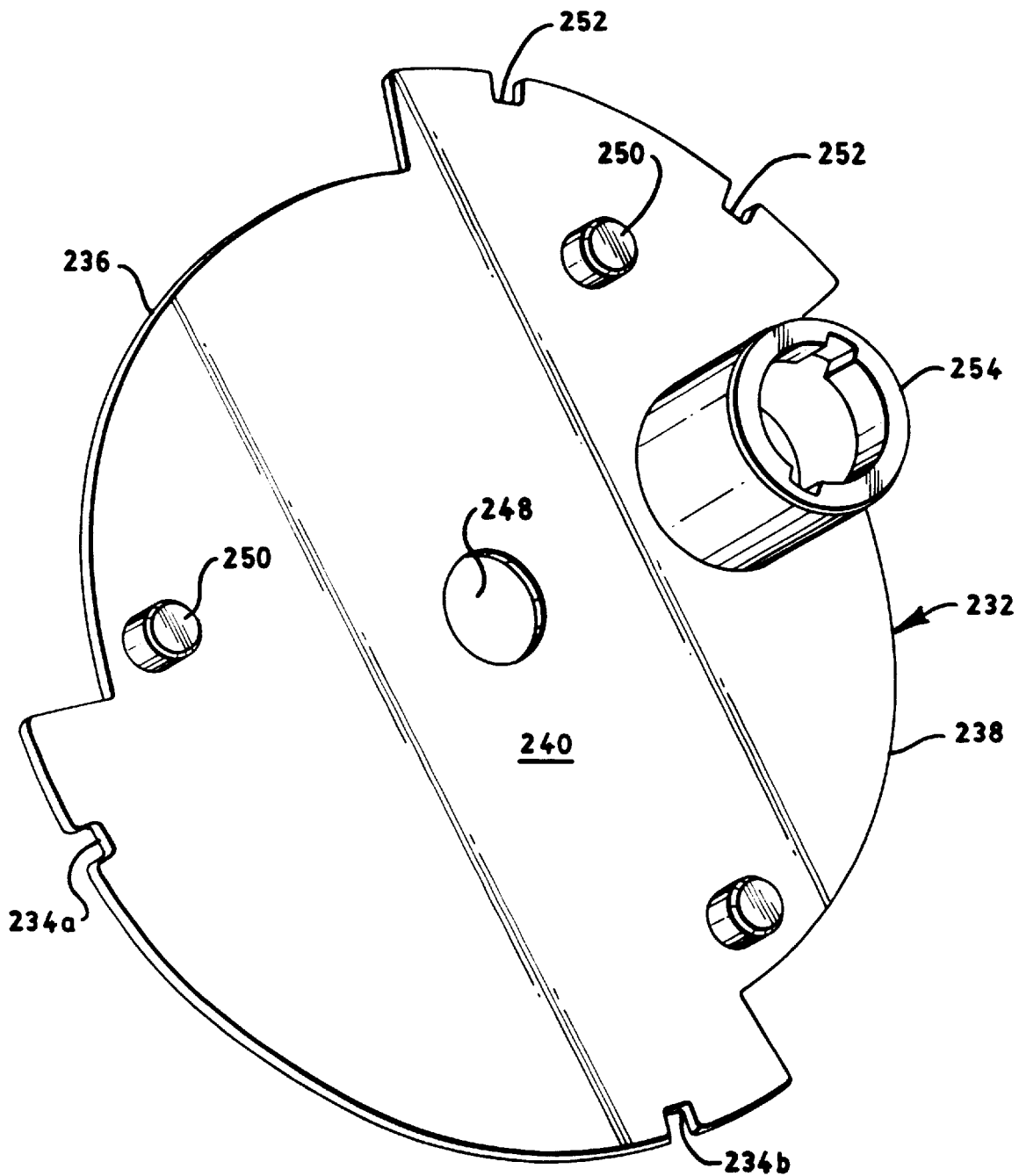
FIG. 2C is a perspective view of a lid for the filter cartridge of the present invention.

FIG. 2B shows a modification of the disc-dam unit 32 wherein the disc-dam unit in FIG. 2B is identified by the numeral 132 and the only difference is the cut out segment 134. In particular, disc-dam unit 132 is generally positioned in the upper portion of the upper section 12 for receipt of a level alarm, level indicating device, or the like, which may be placed within the incoming discharge waste water into the filter cartridge. When a level indicator, level control, level alarm, or the like, is utilized, the top plate, as shown in FIG. 2C, is utilized as the top disc of a filter cartridge. This disc, identified by numeral 232, is provided with a planar surface 240 with an opening 248 therein to receive the pipe 60 therethrough. Notches 252 are provided for engagement with the lobes 54c, particularly in the upper section 12. Connectors 250 are also provided for alignment and inner connecting with the disc 232 and an underlying disc 132. Moreover, cut-outs 234a and 234b are provided for alignment with terminating edges 34a and 34b of the discs 32 and 132 and are received by the sealing members 24c in the upper filter housing section 12. Cut-outs 236 and 238 are also provided in case of an overflow so that the disc 232 does not have an overflow of waste water in case the liquid level exceeds the top of the filter cartridge.

Upwardly extending coupling 254 is provided to receive the level control, level alarm, level indicating means and the like. The coupling 254 is in alignment with the cut-out 134 in the disc 132.

FIGS. 5A, 5B and 5C show the details of the three different sections which make up the housing of the filter housing 10. Each of the housing sections 12, 14 and 16 have means to connect to one another in a stacking arrangement. In a preferred embodiment, at least an upper section 12 is mounted to a lower section 16. For units which require filter cartridges longer than the filter cartridge which can be arranged in a spaced stacked arrangement in the two sections 12 and 16, middle filter housing sections 14 are provided;

and, any number of sections 14 may be added to the stacking arrangement and is only defined by the vertical height of the filter cartridge as desired by the user.

Figure 4A:
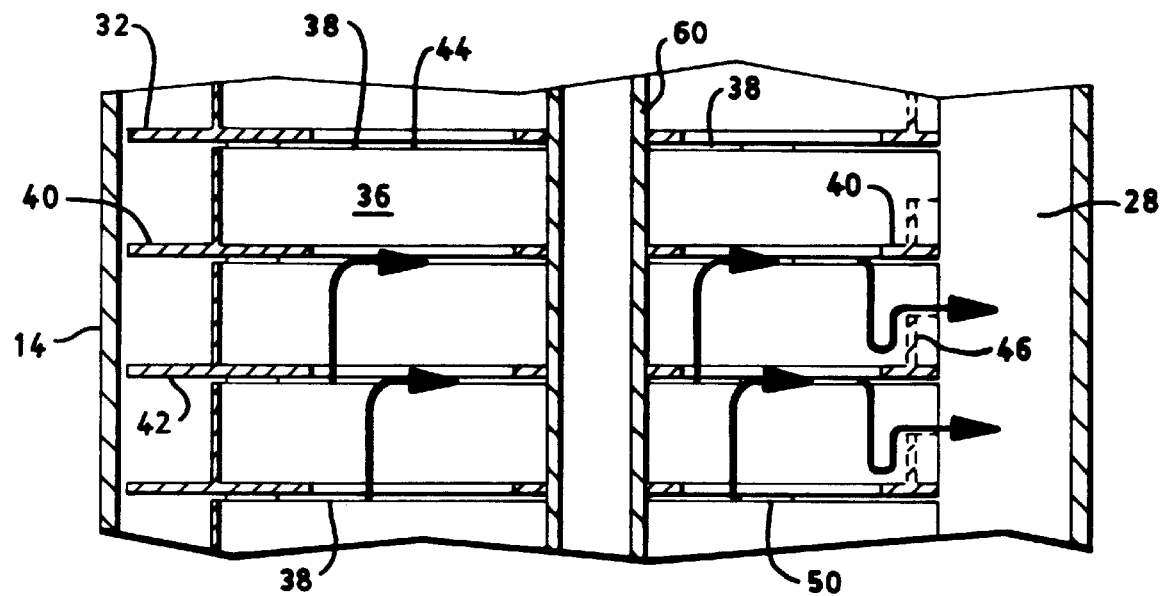
FIG. 4A is an enlarged segmental view showing a method of operation of the filter assembly shown in FIG. 1.
Figure 4B:
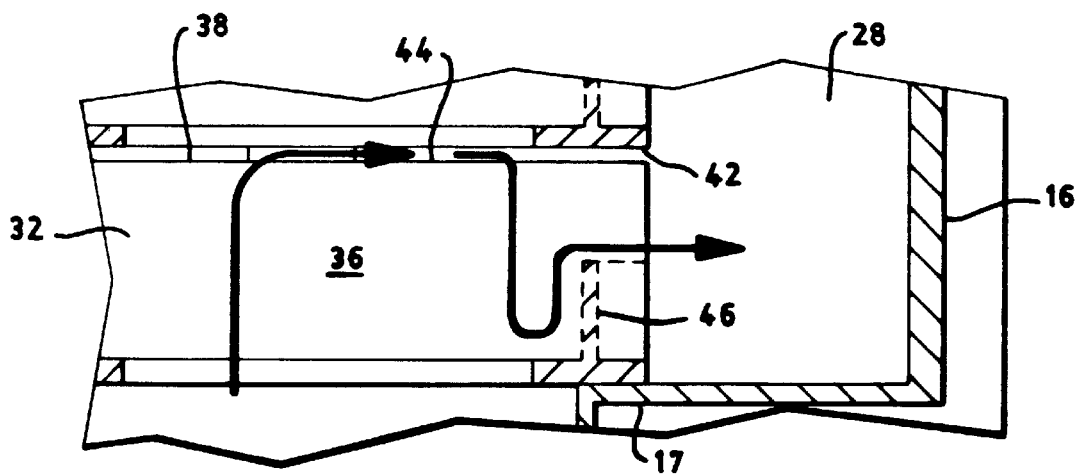
FIG. 4B is an enlarged segmental view of the orientation of the discs of the present invention received within the lower section of the housing, as shown in an assembled unit of FIG. 1.

In FIG. 5A, the lower section 16 is provided with an inwardly extending sealing edge 17 adjacent a bottom end of the outlet flow chamber 28, which, as shown in FIG. 4B, receives the second dam 46 thereon to prevent the flow or the intermingling of filtered effluent in the chamber 28 with the incoming waste water flowing upwards through the opening 119, thereby the sealing edge 17 covering and sealing the bottom end of the outlet flow chamber 28. The lower section 16 is provided with lobes 54c which are for alignment with lobes 54b in lower section 14 and lobes 54a in the upper section 12. The upper portion of the lower section 16 is provided with an inwardly extending step 16b which receives the lower terminating edge 14a of the middle section 14 or the lower terminating edge 12a of the upper section 12. The lower terminating edges 12a and 14a are of a reduced diameter from the diameter of the exposed outer surface of the remainder of housing portions 12 and 14, respectively. Moreover, the vertical height of the lower terminating edges 12a and 14a are the same distance as the distance of the upper terminating edge 16a from section 16 from step 16d. And, in a stacked arrangement the outside or exposed outer surface of the diameter of the housing is of the same diameter from the upper section to the lower section.

As shown in FIG. 5B, the middle section is provided with lobes 54b which are for alignment with the lobes 54c and 54a and the seal members 24b which extend vertically along the inner surface of the cylindrical housing section. As shown in the cut-out, middle housing section 14 is provided with a step 14b which is a preselected distance from the terminating edge 14c to receive the lower terminating edge 14a of a middle filter housing section 14 or the lower terminating edge 12a of an upper housing section 12.

As shown in FIG. 5C, an upper section 12 is provided with the outlet 18 which is comprised of a plurality of rings 20 and 22 to attach to a waste water treatment tank outlet 14. Upper section 12 is also provided with lobes 54a for alignment with lobes 54b and 54c and engagement with the cut-outs 52 in the discs 32, 132. Sealing members 24a are also provided for engagement with the terminating edges 34a and b of the disc 32.

In operation, as shown in FIGS. 3, 4A, 4B and 6, waste water enters the waste water treatment tank 2 through a waste water inlet 8. Tank 2 generally includes at least one or more openings therein identified by the numeral 4 with a cover 6 thereover which provide for entrance to the tank. At least one opening 4 is shown in alignment with a filter housing 10 for easy removal of the sections 12, 14, 16 or discs 32 in filter housing 10. The waste water entering the tank 2 fills until the level 9 is reached which is in alignment with the waste water discharge outlet 19. The flow of the waste water is up through the lower filter section 16 and is discharged through the outlet 18 in the upper section 12. As the waste water discharge flows into the filter housing through the opening 119, the waste water, as shown by the arrows, moves upwardly adjacent to the central portion of the cartridge unit through the slotted openings 38 in the discs 32. The waste water flowing upwards through the slots 38 provides for the settling of the particles, which flow downwardly through the slots 38, as the rising waste water moves upwardly through the slots 38 and over flows the top edges 44 of the dams 36. Spacing between the top edge 44 and the under surface 42 of an overlying disc 32 is of a preselected distance, generally less than an 1/8", so that only very small particles have the opportunity to overflow the top edge 44. Overflowing waste water is filtered at the selected spacing between the under surface 42 and the top edge of the underlying dam top 44 so that relatively clean water exits, into the chamber 28 and out through the outlet discharge 19. By arranging the slots 38 in the curvature of the serpentine configured dam 36 there is little to no turbulence and the turbulence is minimized at the dam top 44 overflow. Also, it has been found that this reduced turbulence promotes "sluffing" at the interior column because of this lack of turbulence created by the water moving across the upstream surface of the disc as the dynamics of the water is flowing in a vertical condition and not in a vertical and horizontal condition.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A filter housing and a filter cartridge comprising:

an upper section with an outlet for flow communication with a waste water treatment tank discharge outlet and a lower section with an open bottom, said upper section being coaxially mounted above said lower section, said upper section and said lower section receiving said filter cartridge therein, said upper section having at least two outwardly extending co-axial rings of different diameters, said co-axial rings comprising a first ring circumscribing a second ring, the first ring having an inner diameter greater than an outer diameter of said second ring, said rings disposed to receive one of a plurality of waste water treatment discharge outlets of different diameters; and said lower section having an inwardly extending sealing edge positioned adjacent a bottom end of an outlet flow chamber, said outlet flow chamber located adjacent an outer side of said filter cartridge, said sealing edge being in contacting relation with a lowermost portion of said filter cartridge, said sealing edge covering and sealing the bottom end of said outlet flow chamber.

2. The filter housing of claim 1, said filter cartridge being a plurality of disc-dam units in a stacked arrangement to define said filter cartridge having a vertically extending longitudinal axis extending from the top of said housing to a lower portion of said housing, each said disc-dam unit being of a generally circular-shaped disc having an outer terminating edge with a cut-out cord segment, the disc-dam unit comprising a base portion having a planar under surface and an upper surface with a first dam of serpentine configuration having a first end and a second end, said dam extending upwards from said upper surface and terminating in a dam top, said first end and said second end defining said cord segment therebetween, said first dam dividing said base into upstream and downstream sides, said upstream side being along an outer periphery of said base and said downstream side being along an inner periphery of said base, said cord segment having a second dam connecting said first end and said second end, said second dam having a height less than the height of said first dam, each of said discs having a plurality of openings in said upstream side in flow communication with an adjacent lower disc-dam unit, said cut-outs being aligned to form said outlet flow chamber in flow communication with said housing outlet.

3. The filter housing of claim 2, each of said disc-dam units having a diameter of about 1/8" less than the inside diameter of said filter housing.

4. The filter housing of claim 3 wherein said means to receive disc-dam units includes a plurality of vertically extending lobes extending continuously along the inner surfaces of said upper section and said lower section, each disc having notches in mating relation with said lobes.

5. The filter housing of claim 3 wherein at least one of said disc-dam units includes a second cut-out therein, said disc-dam unit including said second cut-out being positioned adjacent a top of said upper section.

6. The filter housing of claim 3 wherein said second dam height is approximately one-half the height of said first dam height.

7. The filter housing of claim 3, each disc-dam unit having a centrally disposed opening with a vertically extending pipe received through said centrally disposed opening, said vertically-extending pipe having a closed bottom.

8. The filter housing of claim 3, said upstream openings being disposed at curved portions within said serpentine configuration.

9. The filter housing of claim 3, each said disc-dam unit terminating edge being adjacent an inner surface of one of said upper section or said lower section.

10. The filter housing of claim 2, said lower section having said inwardly extending sealing edge positioned for alignment with said disc-dam unit cut-outs, said sealing edge being in contacting relation with a lowermost disc-dam unit, said sealing edge covering said cut-out of said lowermost disc-dam unit.

11. The filter housing of claim 1 including at least one middle section housing, said middle section housing mounted between said upper section and said lower section, said middle section having means to receive said filter cartridge being comprised of a plurality of disc-dam units therein.

12. The filter housing of claim 1, said rings being of preselected size and thickness to receive waste water discharge outlets of a plurality of various diameters.

* * * * *